Figure 1:
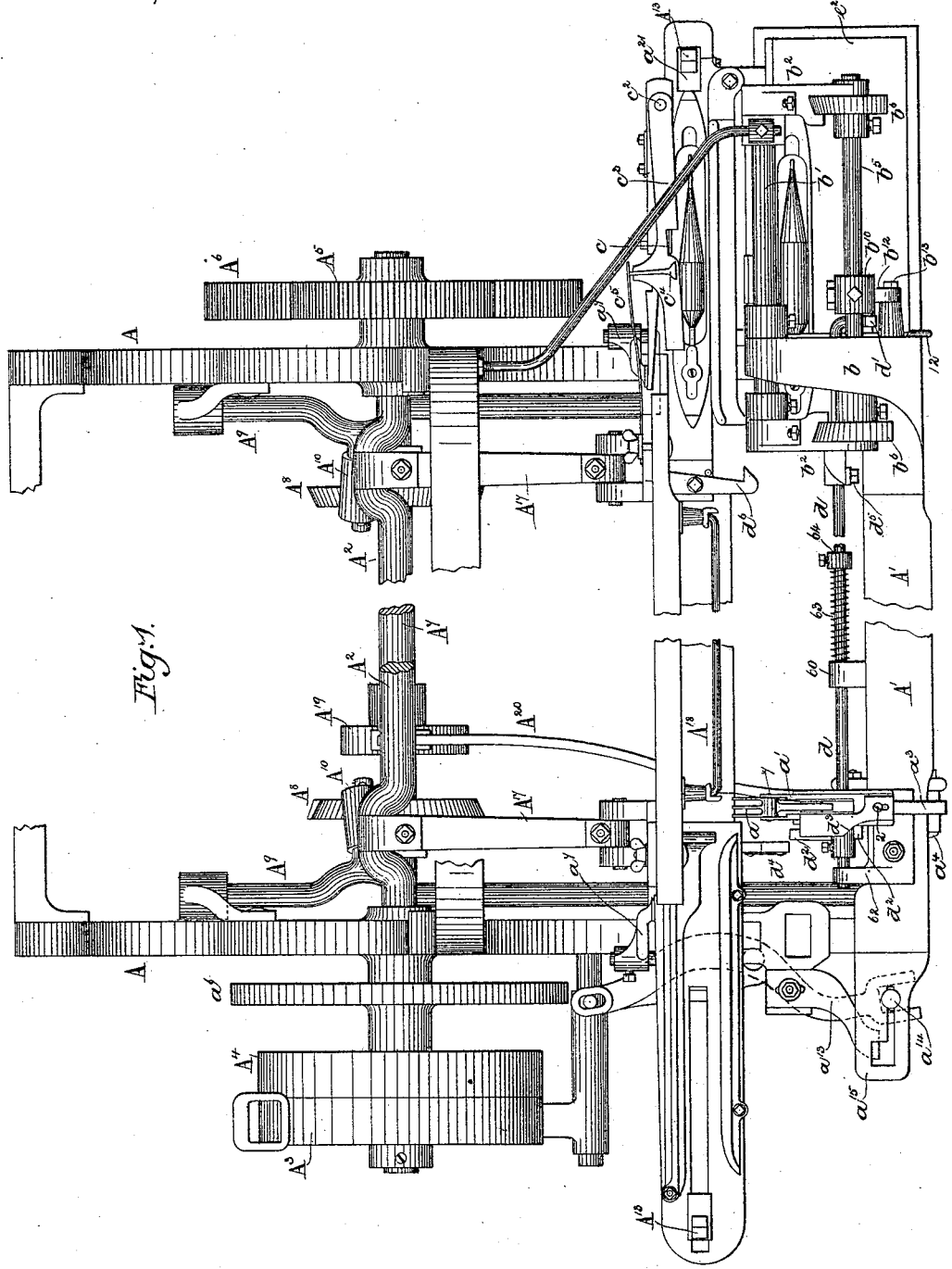

(No Model.) 8 Sheets—Sheet 1.

J. H. NORTHROP.
LOOM.

No. 454,805. Patented June 23, 1891.

Witnesses:
Edgar A. Goddin
Frederick L. Emery

Inventor:
James H. Northrop,
by Crosby & Gregory
Attys.

(No Model.)  J. H. NORTHROP.  8 Sheets—Sheet 2.
LOOM.

No. 454,805.  Patented June 23, 1891.

Witnesses:
Edgar A. Godden
Frederick L. Emery

Inventor.
James H. Northrop,
by Crosby & Gregory
Attys.

(No Model.)  J. H. NORTHROP.  8 Sheets—Sheet 3.
LOOM.

No. 454,805.  Patented June 23, 1891.

Witnesses:
Edgar A. Goddin
Frederick L. Emery

Inventor.
James H. Northrop,
by Crosby & Gregory
Attys.

(No Model.)  J. H. NORTHROP.  8 Sheets—Sheet 5.
LOOM.

No. 454,805.  Patented June 23, 1891.

Witnesses:
Edgar A. Goldin
Frederick L. Emery

Inventor:
James H. Northrop,
by Crosby & Gregory
Attys.

(No Model.) 8 Sheets—Sheet 6.
J. H. NORTHROP.
LOOM.
No. 454,805. Patented June 23, 1891.
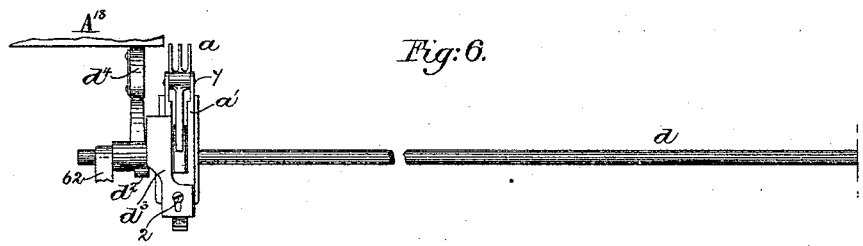
Fig. 6.
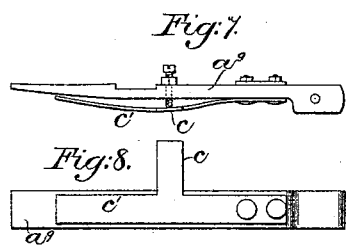
Fig. 7.
Fig. 8.
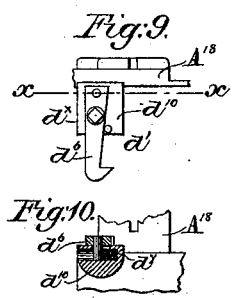
Fig. 9.
Fig. 10.
Fig. 11.
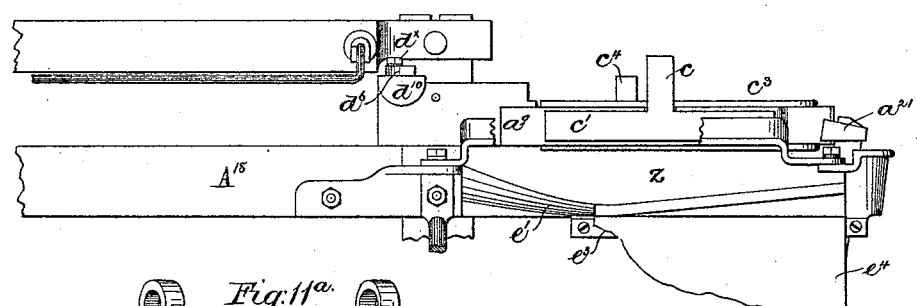
Fig. 11ª.
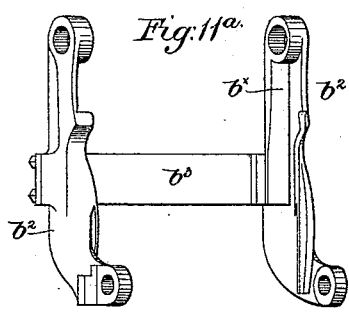
Fig. 11ᵇ.
Witnesses:
Edgar A. Goddin
Frederick L. Emery
Inventor
James H. Northrop,
by Crosby & Gregory
Attys.

(No Model.)  J. H. NORTHROP.  8 Sheets—Sheet 7.
LOOM.
No. 454,805.  Patented June 23, 1891.
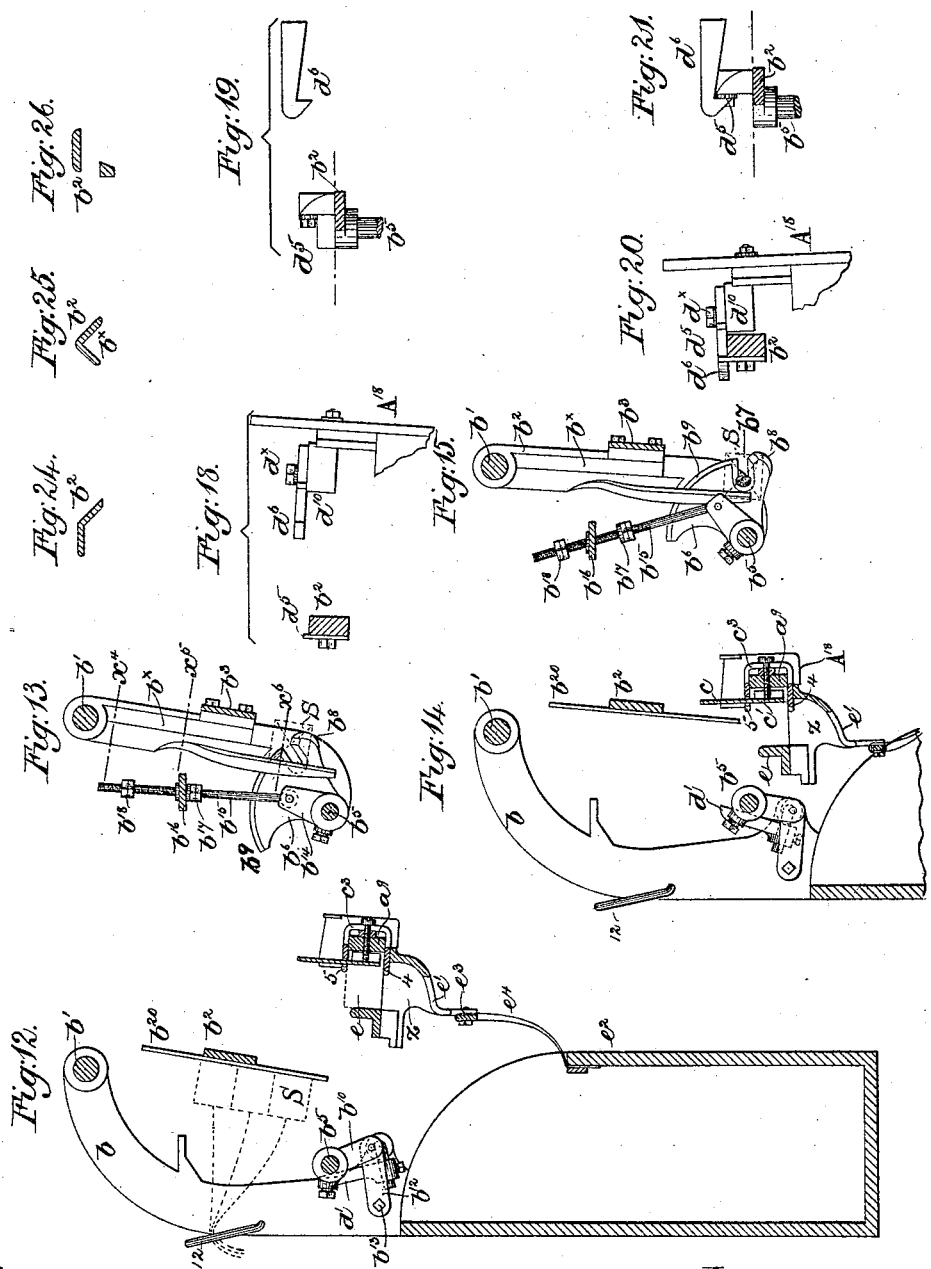

(No Model.)  J. H. NORTHROP.  8 Sheets—Sheet 8.
LOOM.
No. 454,805.  Patented June 23, 1891.
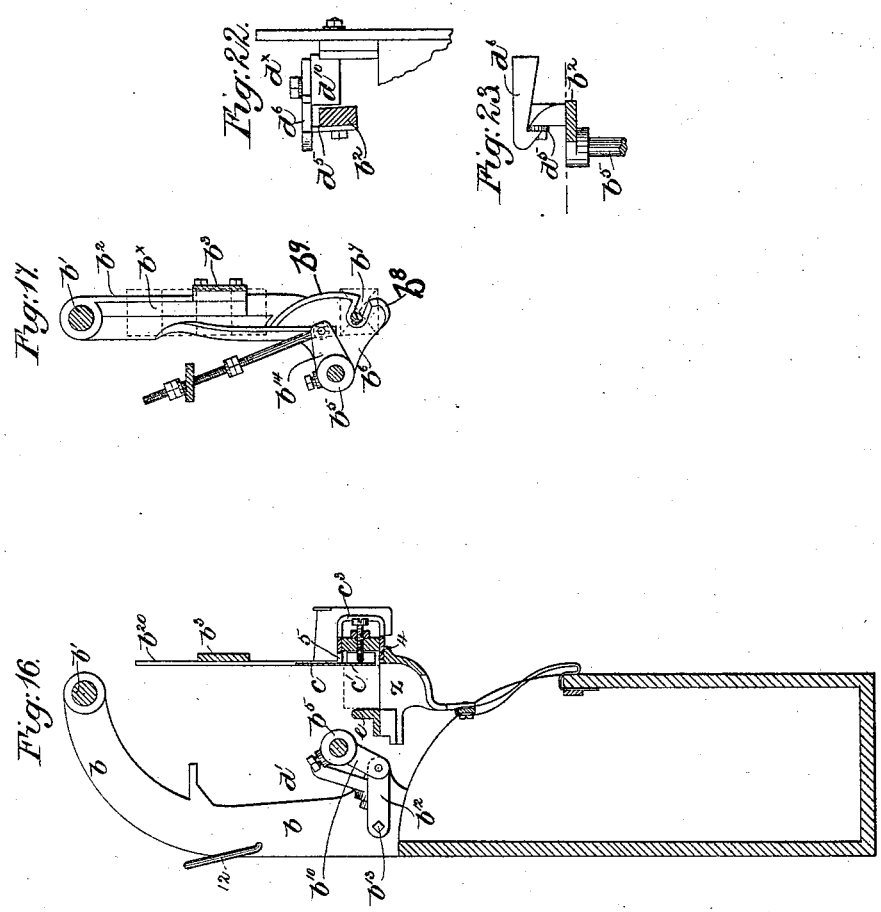

UNITED STATES PATENT OFFICE.

JAMES H. NORTHROP, OF HOPEDALE, MASSACHUSETTS, ASSIGNOR TO GEORGE DRAPER & SONS, OF SAME PLACE.

LOOM.

SPECIFICATION forming part of Letters Patent No. 454,805, dated June 23, 1891.

Application filed December 24, 1889. Serial No. 334,873. (No model.)

*To all whom it may concern:*

Be it known that I, JAMES H. NORTHROP, of Hopedale, county of Worcester, State of Massachusetts, but a subject of the Queen of Great Britain, have invented an Improvement in Looms, of which the following description, in connection with the accompanying drawings, is a specification, like letters on the drawings representing like parts.

The object of my invention is to automatically keep up the supply of weft in a loom, which I do, as herein provided for, by placing shuttles in the shuttle-box of a loom while the loom is running.

An essential part of my invention is a shuttle-feeding apparatus which is normally unconnected with the moving parts of the loom, but which is connected to and moves with the lay when a filling-thread is broken or exhausted to substitute a new shuttle in the shuttle-box for one whose filling-thread is broken or exhausted.

The shuttle-feeding apparatus herein shown consists of two parts, one of which I call a "shuttle receiver" or "hopper," into which the shuttles are placed, which are to be fed to the shuttle-box when required, while another part, which I call the "shuttle-transferrer," receives one by one the shuttles placed in the hopper and carries them to the shuttle-box. When a change of shuttles is required, this shuttle-feeding apparatus is temporarily connected with the lay of the loom, which by its movement effects the transfer of a shuttle from the shuttle-transferrer to the shuttle-box. As the lay of the loom may make nearly or quite two hundred strokes a minute, it is obvious that the time for the introduction of the shuttle into the shuttle-box is very short, and if it is done at the end of a stroke the change of shuttles must be practically instantaneous. To secure more time for the change, I make it during the movement of the lay, and in the apparatus hereinafter described, which is the best embodiment of my invention now known to me, I make it during the back-stroke of the lay. This connection of the shuttle-feeding apparatus with the lay during its back-stroke I regard as another important feature of my invention. In the apparatus hereinafter described I also gain more time for the necessary movements of the apparatus by beginning those movements during the forward stroke of the lay and advancing the shuttle-feeding apparatus to meet and connect with the lay.

In the embodiment of my inventions hereinafter described I have connected the shuttle-changing apparatus with the filling-fork of the loom as a means of bringing the apparatus into action when a change of shuttle is required. The shuttle-hopper is a swinging frame pivoted at its upper end and provided with side pieces having grooves in their inner face, which receive the tips of the shuttles and hold and conduct them to the shuttle-carrier.

The shuttle-transferrer is a rock-shaft pivoted to the lower ends of the side pieces of the hopper and having at each end an arm shown as of sector shape with a notch which is entered by the tip of a shuttle as it descends from the hopper.

The holding of the shuttles by their tips while being carried into the shuttle-box is one of the important features of my invention.

The application of this shuttle-feeding apparatus to a loom involves some changes in and additions to the shuttle-box as commonly constructed, in order to adapt it for the reception of a shuttle from the shuttle-transferrer and for its removal when required to make place for another shuttle.

Other features auxiliary to those above described will become apparent from the detailed description of the various parts required to perform the operation of changing the shuttles while the weaving is going on in the embodiment of my invention, which I will now describe.

Figure 2:
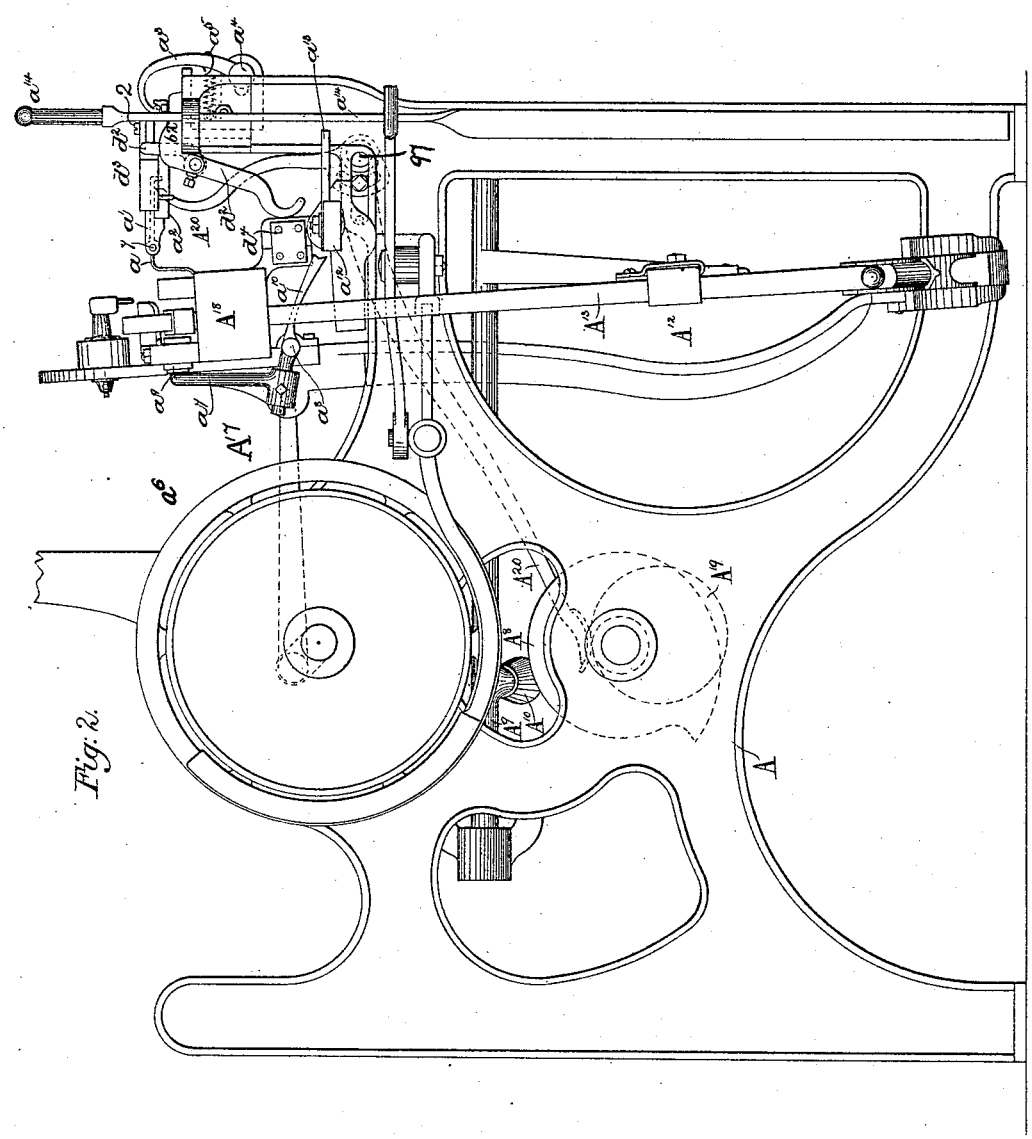
Figure 3:
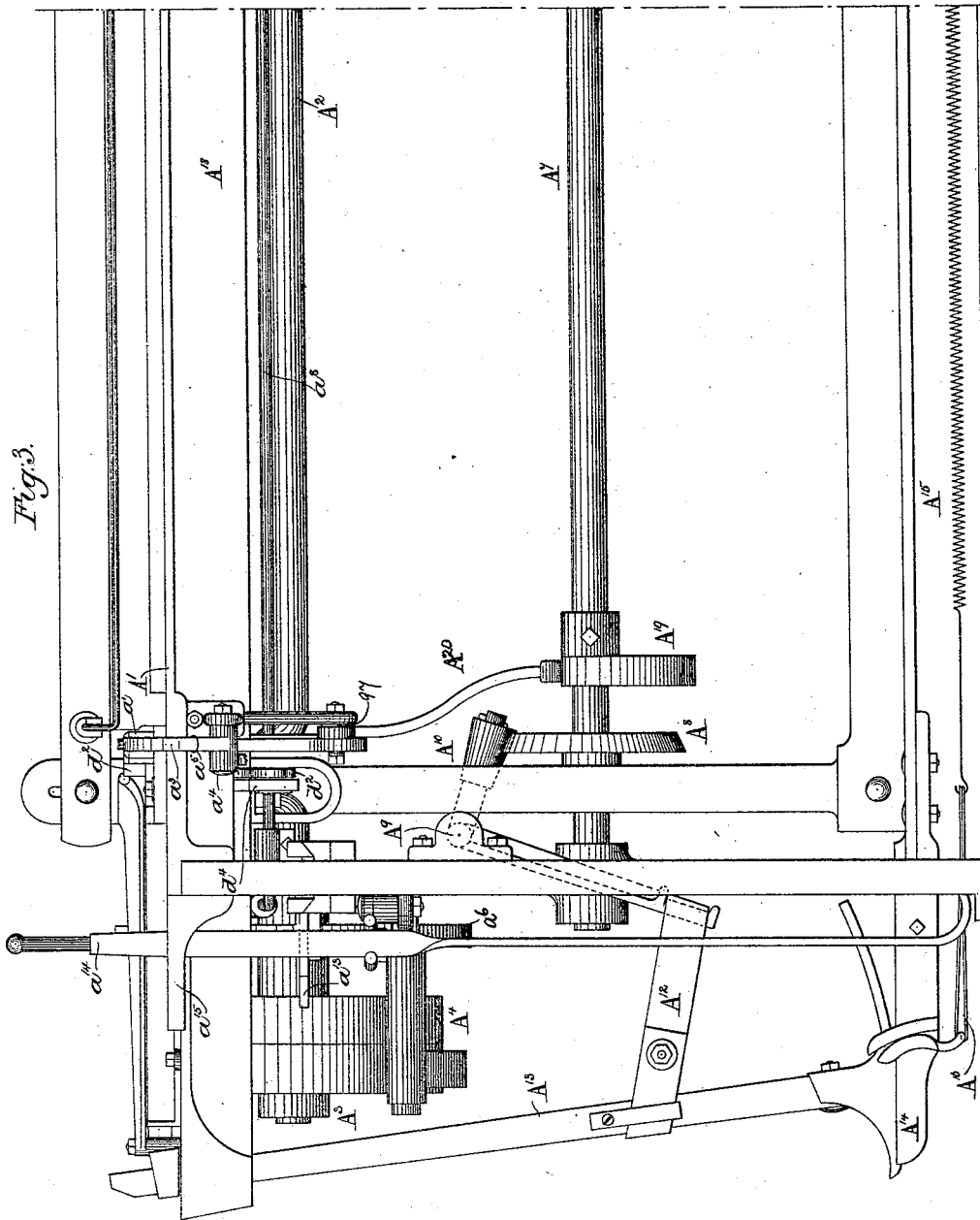
Figure 4:
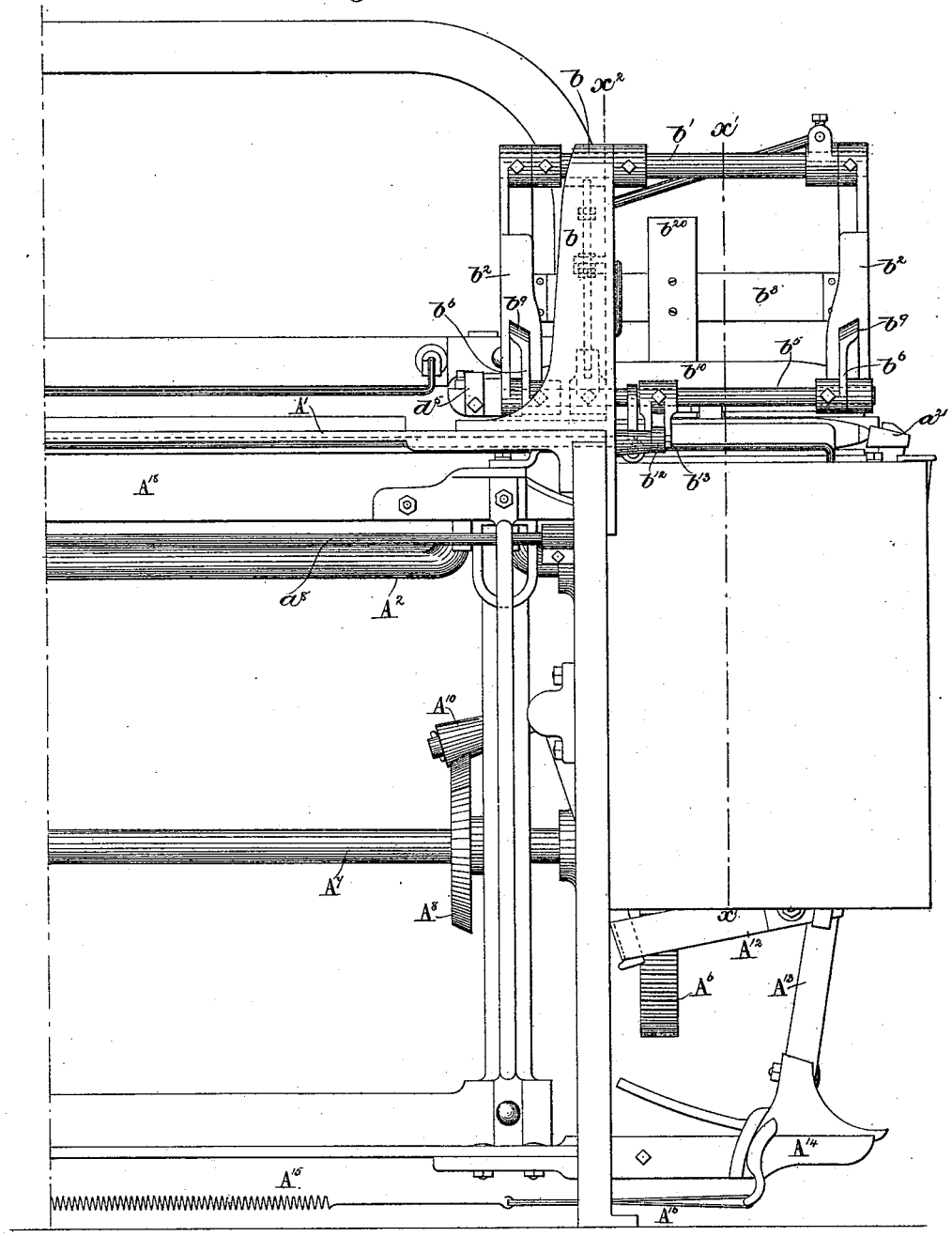
Figure 5:
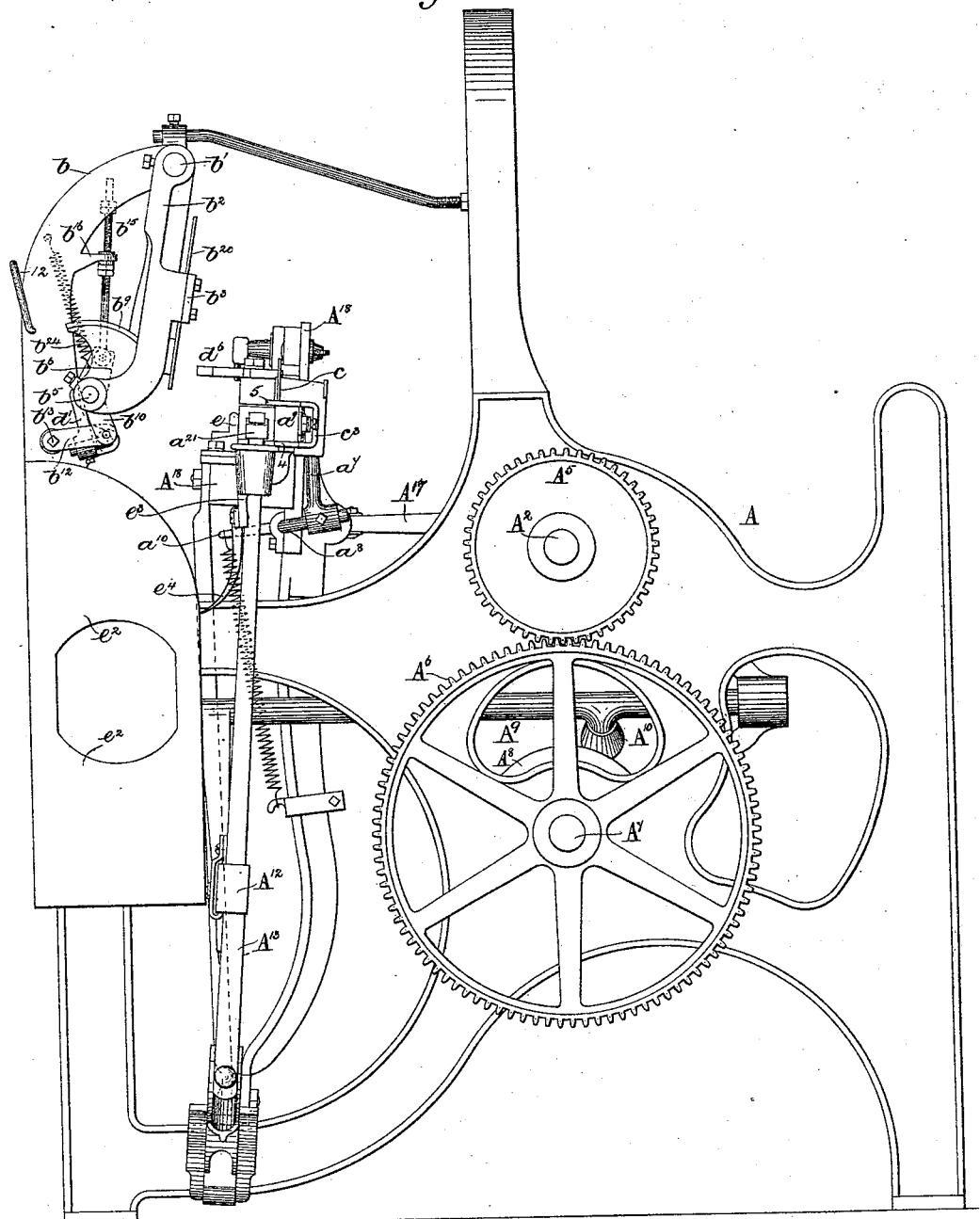

In the drawings, Figure 1 is a plan view, broken out centrally, of a loom containing my invention, the harness mechanism, let-off, and take-up being omitted; Fig. 2, a left-hand end view of the loom shown in Fig. 1. Fig. 3 is a front elevation of the left half of the loom; Fig. 4, a front elevation of the right half of the loom, Figs. 3 and 4 showing together substantially the entire front of the loom; Fig. 5, a right-hand end elevation of the loom shown in Fig. 1; Fig. 6, a detail showing part of the weft-stopping mechanism; Figs. 7 and 8, details of the shuttle-box binders; Fig. 9, a detail showing part of the lay and the locking device to aid in locking or coupling the hopper to the lay; Fig. 10, a section of Fig. 9 in the line $x\ x$. Fig. 11 is a partial front view of the right-hand end of the lay shown in Fig. 1, with part of the flexible chute; Fig. 11$^a$, a detail showing the hopper detached. Fig. 11$^b$ shows the shaft $b^5$ and its attached parts. Fig. 12 is a partial section in the line $x'$, Fig. 4, looking to the left, the section-line cutting the shuttle-box, the hopper having, as shown by dotted lines, three shuttles, a shuttle being shown by dotted lines as in the shuttle-box and on the lever, constituting a movable rest, to be described. Fig. 13 is a partial section in the line $x^2$, Fig. 4, looking to the left, Figs. 12 and 13 showing the position of the hopper when the weft or filling is being properly supplied, the hopper at such times remaining at rest or not moving with the lay. Figs. 14 and 15 are like sections, the parts being, however, shown as in the position they will occupy just after the weft-stop mechanism has operated because of the absence of the filling in front of the usual weft-fork, the starting device, to be described, having been operated by the weft-fork to start the hopper forward into a position to be caught by a locking device, shown as a hook pivoted on the lay, the locking device acting as the lay completes its beating or forward stroke. Figs. 16 and 17 are like sections, it being supposed that the lay has been moved fully forward to enable the locking device to engage a projection on the hopper, and that the lay has been started on its return or back stroke, at the commencement of which movement, as herein provided for, the spent shuttle is ejected and a shuttle containing filling is inserted. Figs. 18 to 23 are details showing the different positions of the lay, the locking device or connection carried by the lay, and a projection of the hopper to be engaged by the locking device while the positions of the parts are being changed to transfer or feed a shuttle into the shuttle-box, as in Figs. 12 to 17. Figs. 24 to 26 are respectively sections in the lines $x^4\ x^5\ x^6$, Fig. 13.

The frame-work A, the breast-beam A', the crank or lay shaft $A^2$, provided with usual fast and loose pulleys $A^3\ A^4$ and having a toothed wheel $A^5$, the toothed gear $A^6$, engaged by it, the cam-shaft $A^7$, on which the gear $A^6$ is secured, the pick-cams $A^8$, the pick-shafts $A^9$, having bowls $A^{10}$, the straps $A^{12}$, the connected picker-sticks $A^{13}$, shown as having rockers at their lower ends and rocking on beds $A^{14}$, the straps $A^{16}$ and spring $A^{15}$ between the said rockers, the lay connecting-rods $A^{17}$, the chief part of the lay $A^{18}$, the cam $A^{19}$ on the cam-shaft to actuate the weft-hammer $A^{20}$, the weft-fork or feeler $a$, the slide $a'$ on which it is pivoted, the guide $a^2$ for the said slide, the lever $a^3$, pivoted at $a^4$, (see Fig. 3,) where the lever is broken off, the spring $a^5$ to act upon and normally keep the weft-slide $a'$ pressed toward the lay, the brake-wheel $a^6$, the binder-fingers $a^7$, one at each end of the rock-shaft $a^8$ at the under side of the lay and acting on the binders $a^9$, the dagger $a^{10}$, carried by the said rock-shaft, the slide $a^{12}$, laid loosely upon the loom-frame and guided by it, and the striker $a^{13}$, carried by the said slide and adapted when the latter is moved forward by the dagger to strike the shipper-handle $a^{14}$ and knock it out of the usual holding-notch in the notched plate $a^{15}$, are and may be all as usual, the said parts, as herein shown, being substantially such as are contained in other looms for weaving cotton cloth, and not being of my invention need not be herein specifically further described.

The stand $b$, detached from the lay and located at or near the breast-beam, has a support $b'$ for the hopper, adapted to contain the shuttles which are to be automatically supplied to the lay at the proper time.

The hopper (shown separately in Fig. 11$^a$) is composed of two arms or side pieces $b^2\ b^2$ and a cross-bar $b^3$, the inner sides of the said arms being shown as grooved longitudinally at $b^\times$ (see Figs. 13, 15, and 17) to receive the usual metal points or tips of a series of shuttles, there being in practice several such shuttles in the said hopper, Figs. 24, 25, and 26 showing cross-sections of one of the arms $b^2$, indicating the shape of the groove referred to. The arms $b^2$ at their lower ends have bearings for a rock-shaft $b^5$, provided near the inner side of each arm $b^2$ with arms $b^6$, represented as of sector shape, (see Fig. 11$^b$,) each arm being notched at $b^7$ to receive the tips or points of the lowermost shuttle S in the hopper, the said arms normally standing, as shown in Fig. 13, in which figure the lowermost shuttle in the hopper is shown by dotted lines. Notching the arms of the transferrer leaves two projections $b^8\ b^9$ on each arm.

In practice the projection $b^8$ of the outer arm, besides supporting the shuttle to be transferred into the shuttle-box of the lay, also acts by its beveled edge (see Figs. 13 and 15) to strike against the inner end of the usual picker $a^{21}$, provided the same should by accident have bounded or recoiled slightly, so as to be in the way of the shuttle coming into the shuttle-box from the hopper. The projections $b^8$ also assist in ejecting the spent shuttle when the transferrer does not contain a shuttle. The edge of each projection $b^9$ is shown as beveled inwardly one toward the other, (see Figs. 4 and 11$^b$,) the said bevels corresponding substantially with the bevels of the points of the shuttle, said bevels guarding against any end-thrust of the shuttle resting on the transferrer. The shaft $b^5$ has an arm $b^{10}$, to which is jointed a link $b^{12}$, pivoted at $b^{13}$ on the stand $b$ or on some fixed part of the loom, so that when the hopper is moved or carried, as will be hereinafter described, in unison with the lay for a part of its backward stroke the said rock-shaft will be partially rotated and cause the transferrer engaging the points of the lowest shuttle of the series of shuttles in the hopper to carry or feed such shuttle down or out through the hopper and place it in the lay shuttle-box then under it, the projections $b^9$ at such time coming under and supporting the shuttle next above the one held in the notches $b^7$ and then being transferred into the shuttle-box $e$; but as the hopper is returned into its normal position the said projections $b^9$ travel back under and in contact with the lowermost shuttle in the hopper until the said shuttle drops into the notch $b^7$.

To determine the extent of the rocking motion of the shaft $b^5$, I have provided it with an arm $b^{14}$, (see Fig. 13,) to which is jointed the stop shown as a rod $b^{15}$, having a screw-thread and extended through a fixed ear $b^{16}$, the rod being provided below and above the said ear with adjustable nuts $b^{17}$ $b^{18}$, which are properly adjusted to contact with the said ear at the proper times, a spring, as $b^{24}$, (see Fig. 5,) connected to the arm $b^{14}$ and to the stand $b$, normally acting to not only draw the hopper back into its normal position, Figs. 5, 12, and 13, but also to turn the rock-shaft $b^5$ and its arms in the direction to place the notches $b^7$ in position to receive a shuttle. The cross-bar $b^3$ has secured to it, as shown, a striker-plate $b^{20}$, which, when the holder and lay change their normal relative positions, as from Figs. 14 to 17, strikes a projection $c^4$ on a swinging arm $c^3$, pivoted at $c^2$, the shape of the said arm being best shown in Figs. 1 and 14. This arm $c^3$ carries a rest 4 and a lip 5 above it, the said rest, when the said lever is in the position shown in Figs. 12 and 14, serving to support the shuttle in the shuttle-box $e$, the lip 5 overlapping the shuttle and preventing it from rising over the top of the shuttle-box. The binder $a^9$ is located within the arm $c^3$ and pivoted to the shuttle-box by the same pin $c^2$. The binder shown is one of usual well-known form, and is provided at its inner side with a metal plate $c'$, having a projection $c$. The contact of the plate $b^{20}$ with the arm $c^3$ causes the latter to be pressed back against a spring $c^5$ into the position Fig. 16, where it will be seen that the rest 4 is withdrawn from below and the lip 5 from above the spent shuttle in the shuttle-box, so that the spent shuttle, after the binder has been pushed outwardly, as will be described, is free to be pushed down through the open bottom of the shuttle-box $e$, the descent of the spent shuttle being hastened by the blow against its upper side of the under side of the shuttle then held by the transferrer, and being transferred from the hopper into the said shuttle-box, the spring $c^5$ acting to return the arm $c^3$ into its normal position when the pressure on the said arm is removed. The spent shuttle falls into the supplemental chamber $z$ and there strikes the deflecting-ledge $e'$, which insures its direction point first out through an opening at that side of the said chamber next to the breast-beam into the spent-shuttle receptacle $e^2$, said side opening being of material advantage, as it insures the passage of the shuttle from the said chamber in such direction that it cannot be struck at its tip by the picker-stick as the latter is moved forward to strike and throw the shuttle just deposited in the shuttle-box, and should the stick by accident strike any part of the spent shuttle it would be its side farthest from the lay at a point back of its tip, thus accelerating the passage of the spent shuttle into the shuttle-receptacle $e^2$, connected, preferably, directly to the loom side. Joined to the receptacle $e^2$ and to a cross-bar $e^3$, located just below the supplemental chamber, is a chute or apron $e^4$, preferably a piece of fabric, which receives upon it and insures the passage of the spent shuttle into the said receptacle.

The hopper, as herein described and represented, is adapted to oscillate about the pivot or support $b'$, shown as located somewhat inside a vertical line parallel to the inner side of the breast-beam, the body of the hopper thus normally inclining downwardly and forwardly from the said pivot or support toward the front of the loom, so as not to interfere with the lay in its movements, yet by a slight movement of the hopper, hereinafter denominated its "initial" movement, the latter may be moved forward toward the approaching lay into a substantially vertical position, in which position the hopper will be caught and locked to the lay, so that while the lay is on its back-stroke the hopper will be moved in unison with the lay for a short distance, during which time a shuttle will be transferred or fed directly from the hopper into the shuttle-box $e$ then below it.

The breast-beam has at its inner side and top suitable bearings 60 62 for a shaft $d$, provided at one end (see Fig. 1) with a finger $d'$ and near its other end (see Figs. 1 and 2) with a lever $d^2$, the upper end of which is substantially in contact with a cam $d^3$, shown as adjustably attached by a screw 2 to the slide $a'$ of the weft fork or feeler, the said shaft, lever, and arm constituting one form of a starting device by which to give to the hopper its initial movement. When the said slide is moved back by or through the usual weft-fork hammer, pivoted at 97, all as and under usual circumstances well understood by weavers, the said cam by acting against one arm of the lever $d^2$ moves the shaft $d$ sufficiently in the direction of its length to place the lower end of the said lever $d^2$ in the range of movement of a bunter or striker $d^4$, shown as attached to and moving with the lay, so that the said bunter will strike against the said lever and turn the shaft $d$ sufficiently to cause the finger $d'$ thereof to act on the rock-shaft $b^5$, and thus give to the hopper its initial movement toward the lay, such movement being sufficient to enable a projection $d^5$ on the hopper to be caught by the locking device or hook $d^6$, shown as pivoted at $d^x$ on a lug $d^{10}$, carried by the lay, the said locking device being normally acted upon by a spring $d^7$, (see Fig. 10,) the said locking device, as herein provided for, engaging the said projection $d^5$ at or near the extreme forward movement of the lay, but only after the initial movement has been given to the hopper to cause it to approach the lay, as described, the lay as it starts back taking the hopper or the lower end thereof back in unison with it for a part of the backward stroke of the lay, this second movement of the hopper, due to or in unison with the lay, resulting in turning the transferrer sufficiently to cause it to place in the shuttle-box $e$, the lowermost shuttle engaged by the transferrer, the said shuttle-box being at such time directly under the hopper, which latter is then moving with the lay and at the same speed.

The shaft $d$ is surrounded by a spring 63, which rests at one end against the bearing 60, the other end of the spring acting against a collar 64 on the shaft, the said spring acting normally to move the shaft in the direction to keep the lever $d^2$ out of the range of movement of the bunter. Fig. 14 shows the position in which the said shaft $b^5$ is left by the finger $d'$, it having moved the said shaft from the position Fig. 12; and Fig. 16 shows the shaft $b^5$ as moved farther and away from the said finger, this being effected by the locking device $d^6$, (see Figs. 22 and 23,) then in engagement with the projection $d^5$. As the lay is moved forward from its position Fig. 14, the hopper having received its described initial movement by or through the weft fork or feeler, the projection $c$ on the metal plate $c'$, attached to the binder, strikes against the side of the shuttle held by the transferrer and next to be put into the shuttle-box $e$, and as the lay continues its forward movement to effect the locking of the lay to the hopper, the binder and the arm $c^3$ are both pressed back, so that the spent shuttle is left free from the pressure of the binder, so that it may be ejected.

I have described the employment, as I prefer, of a rest 4 below the shuttle; but the shuttle might be kept in the box without the said rest, for the binder by its action on the shuttle may be made to prevent the shuttle from dropping out through the shuttle-box until pushed back, as before described. The ends of the filling extended out from the shuttles contained in the holder will, in practice, be secured to a suitable catch or stud 12. (See Fig. 12.)

The shuttle by striking the projection $c$ of the plate $c'$ pushes the same back and at the same time moves back the binder, which latter, acting on the adjacent binder-finger, turns the binder rock-shaft, so that the dagger cannot knock off the loom; but should all the shuttles be exhausted from the hopper when the weft breaks or runs out of the shuttle at that time in the shuttle-box, then in such case the projection $b^8$ of the transferrer when turned will act on and press the spent shuttle down below the binder, leaving the spent shuttle free to fall, and as another shuttle is not inserted to keep the binder open the latter will close, and the dagger controlled by it will drop and engage the slide and knock off the loom.

My invention is not limited to the illustrated form of weft or filling fork or feeler or of the starting devices between the said fork and the hopper to effect the initial movement of the hopper, nor to the shape or construction of the hopper or its means of support, nor to the form of mechanism shown for transferring the shuttle from the hopper to the shuttle-box, as any equivalent mechanical device can be used therefor; nor is it limited to the special device shown and described for transferring the shuttle in a positive manner from the hopper into the shuttle-box; nor to the form of stop for regulating the extent of the said transferrer's movement, as any equivalent stop or check can be used. Neither is my invention limited to the form of locking devices shown by or through which to automatically effect the temporary locking or coupling together of the holder and lay.

In operation, whenever the weft breaks or the filling is not properly laid, as when the filling is exhausted from the shuttle, the absence of the filling in front of the filling fork or feeler leaves the rear end thereof down, as is well understood, so that the weft-hammer catches the said fork or feeler, pushes it and its carrying-slide back, the cam-piece $d^3$ thereon striking the upper end of the arm $d^2$, connected to the shaft $d$, placing the other end of the said arm in the path of the bunter $d^4$, connected to the lay, so that the latter in its forward movement acts to turn the starting device to give the hopper containing the supply of shuttles its initial movement, as described, leaving the said hopper in such position that the locking or connecting device $d^6$ catches the projection $d^5$ as the lay completes its forward stroke, and as the lay with the hopper locked or coupled to it starts on its back-stroke the rock-shaft $b^5$ is turned sufficiently to cause the transferrer holding the lowermost shuttle, the arm $c^3$ and the plate $c'$ being then pressed back, as described, to release the spent shutttle from under pressure to push the said shuttle against the shuttle then in the shuttle-box and transfer the new shuttle into the said box. The transfer of the shuttle from the hopper into the shuttle-box is effected during a portion of the back-stroke of the lay, and as soon as the transfer is effected, the movement of the hopper being arrested by the link $b^{12}$, the lay in its farther backward movement causes the locking device $d^6$ to slide off of the top of the projection $d^5$, the arcs of movement of the lay and pivoted shuttle-holder permitting such disengagement, the spring $b^{24}$ then putting the hopper back into its normal position, Figs. 5, 12, and 13.

In my invention the shuttle to be supplied to the shuttle-box is presented so closely to the shuttle-box that as soon as the lay and hopper come together the transferrer, with but a very slight and quick movement, puts a shuttle into the shuttle-box, the spent shuttle retiring in advance of it, the transferrer by a single quick movement positively carrying the shuttle from the hopper directly into the shuttle-box.

Shuttles may be added to the hopper at any time without stopping the lay, which is of great advantage; but it is obvious that a single shuttle may be placed directly on the transferrer, in which case the hopper might be dispensed with. It will also be understood that the shuttles employed are threaded and that the filling hangs out through the delivery-eye in the wall of the shuttle, so that the filling on the shuttle-bobbin may be drawn off the end of the cop or bobbin, as is usual and necessary, and attached to a catch, shown as a stud 12, so that the operator when adding a shuttle to the holder may readily wind the end of the filling about the said stud. In this way the end of the filling is properly held while the shuttle is being transferred from the holder into the shuttle-box of the lay, and while the said shuttle is moving through the shed for its first pick the end of the filling between the selvage and the said pin being subsequently broken off.

The projection $c$ referred to is extended upwardly, so that it normally occupies a position above the lower side of the shuttle in the hopper which is next to be transferred into the shuttle-box, the side of the shuttle as it is being inserted into the shuttle-box being pushed against the said projection, and being thereby guided into its proper position in the box.

The operation of transferring a shuttle to the shuttle-box is so timed as to commence during the forward movement of the lay and be completed during its backward movement, thus gaining more time for the operation and reducing the strains and shocks to the minimum.

I claim—

1. A loom containing the following instrumentalities, viz: a lay, a filling-detector, a feeding apparatus normally unconnected with the moving parts of the loom and consisting of a hopper and a transferrer, and intermediate mechanism whereby when a filling-thread is broken or exhausted the said hopper and transferrer are connected to the lay to move with the latter for a part of its backward stroke, substantially as described.

2. A loom containing the following instrumentalities, viz: a lay having a shuttle-box, a transferrer normally unconnected with the moving parts of the loom, and connections which, when a change of filling is required, effects the movement of the transferrer with the lay on its backward stroke, at which time the transferrer delivers filling, substantially as described.

3. A loom containing the following instrumentalities, viz: the lay having a shuttle-box, a rock-shaft having attached arms to transfer the shuttle into the shuttle-box, and a jointed link connecting the said rock-shaft with the loom-frame to partially rotate the rock-shaft as it is carried or moved back or away from the breast-beam, substantially as described.

4. A loom containing the following instrumentalities, viz: a lay, a shuttle-box thereon, and a hopper and transferring-arms $b^9$ to sustain a shuttle in the said hopper while the transferrer is placing a shuttle in the shuttle-box, substantially as described.

5. A loom containing the following instrumentalities, viz: a lay, a picker-staff, and a transferrer having an arm $b^9$ to force a shuttle from the shuttle-box and press and hold back the picker-staff if out of its proper position when a shuttle is to be placed in the shuttle-box on the lay, substantially as described.

6. A loom containing the following instrumentalities, viz: a lay provided with a shuttle-box, having an open shuttle-discharging passage, a swinging arm $c^3$ to normally close said passage, and a feeding apparatus normally unconnected with the moving parts of the loom and consisting of a hopper and transferrer, and mechanism to cause the said feeding mechanism to move with the lay and actuate the said arm to open the passage through the said shuttle-box, substantially as described.

7. The lay and its shuttle-box, combined with a binder provided with a projection adapted to be acted upon by an incoming shuttle to prevent it from interfering with the downward movement of the shuttle into the shuttle-box and to guide the shuttle to its seat in the box, substantially as described.

8. A loom containing the following instrumentalities, viz: a lay provided with a shuttle-box open at its bottom and having below said bottom a supplemental chamber open at its side next the breast-beam of the loom, as and for the purpose set forth.

9. The picker-staff combined with the lay having a shuttle-box open at its bottom and provided below its bottom with a supplemental chamber open at its side next the breast-beam and having a deflecting-shelf $e'$, to operate substantially as described.

10. The lay, its shuttle-box, and a transferrer, combined with a stop to arrest the movement of the said transferrer toward the shuttle-box, substantially as described.

11. The lay, its shuttle-box, and a feeder comprising a hopper and a transferrer, combined with means to move the feeder away from the breast-beam and with a spring to return it into its normal position, substantially as described.

12. A lay having a shuttle-box provided with a supplemental chamber below the race-way of the lay and shuttle-box and open at one side, combined with a connected flexible chute, to operate substantially as described.

13. A loom containing the following instrumentalities, viz: a lay, its shuttle-box, a transferrer, and devices whereby the transferrer is caused to move with the lay during a part of its backward stroke to keep the transferrer during its operative movements in proper position with relation to the shuttle-box of the lay, substantially as described.

14. The combination, with feeding devices, including a hopper and a transferrer, of a filling-detector and co-operating devices to give to the feeding apparatus an initial movement during the movement of the lay toward the breast-beam to meet the said lay, substantially as described.

15. The lay and its shuttle-box, combined with a transferrer, notched as described to thereby render it positive during the transferring operation, substantially as described.

16. A loom containing the following instrumentalities, viz: a lay, its shuttle-box, a feeding apparatus normally unconnected with the moving parts of the lay and including a hopper and transferrer, the latter being constructed to grasp and positively carry the shuttle from the hopper into the shuttle-box on the lay, substantially as described.

17. A loom containing the following instrumentalities, viz: a lay, its shuttle-box, a transferrer, and connecting devices between it and the lay, whereby the transferrer is connected to and made to travel with the lay during a part of its motion and while the shuttle-box is being fed by the transferrer, substantially as described.

18. The combination, with feeding devices, including a hopper and a transferrer, of a filling-detector and co-operating devices to give to the feeding apparatus an initial movement during the movement of the lay toward the breast-beam to meet the said lay, and connecting devices between it and the lay, whereby the transferrer is connected to and made to travel with the lay during a part of its motion and while the shuttle-box is being fed by the transferrer, substantially as described.

19. A shuttle-feeding apparatus consisting of a hopper and transferrer normally unconnected with the moving parts of the loom, the said feeding apparatus being adapted through the operation of a weft-fork and devices actuated thereby to be connected to and move with the lay in its backward stroke when a weft-thread is broken or exhausted, substantially as described.

20. A loom containing the following instrumentalities, viz: a lay having a shuttle-box provided with an open passage in its bottom, a feeding apparatus normally unconnected with the moving parts of the loom and including a hopper and a transferrer, the hopper being pivoted at a point above the level of the raceway and the transferrer being carried by the hopper and having a movement in the arc of a circle, a weft-fork, starting devices under the control of the said weft-fork to give to the feeding apparatus an initial movement toward and to meet the lay during the movement of the latter toward the breast-beam after any failure in the weft, and devices to engage the said feeding apparatus and move the same at the speed of the lay during part of its backward stroke away from the breast-beam, during which time the transferring operation takes place, substantially as described.

21. A transferrer to hold and embrace the tips of a shuttle, combined with devices to oscillate it while in engagement with and grasping the shuttle, substantially as described.

22. An organized loom containing the following instrumentalities, viz: a lay, a shuttle-box thereon provided with a shuttle-binder, a hopper normally independent of the lay, devices to transfer a shuttle from the said hopper into the said shuttle-box, devices to open the binder while the said shuttle is entering the shuttle-box, and means to close the said binder upon the shuttle when the latter is in operative position in the box, substantially as described.

23. A loom containing the following instrumentalities, viz: a lay, its shuttle-box, a co-operating lip to prevent the rise of the shuttle in the said box, and a hopper normally unconnected with the moving parts of the lay, devices to transfer a shuttle from the said hopper into the said shuttle-box, devices to temporarily remove the said lip to permit a shuttle to enter the shuttle-box, and devices to replace the said lip after placing a shuttle into operative position in the said shuttle box, substantially as described.

24. A loom containing the following instrumentalities, viz: the lay, a weft-fork, a hopper, a bunter, and means between the bunter and the hopper to move the latter toward and to meet the approaching lay, as described.

25. A loom containing the following instrumentalities, viz: a weft-slide, its attached cam $d^3$, and the lay and bunter, combined with the shaft $d$, having a lever which is placed in the line of movement of the bunter when the weft-slide is moved in the absence of filling, substantially as described.

In testimony whereof I have signed my name to this specification in the presence of two subscribing witnesses.

JAMES H. NORTHROP.

Witnesses:
GEO. OTIS DRAPER,
E. D. BANCROFT.